(12) United States Patent
Johnson et al.

(10) Patent No.: US 6,625,745 B1
(45) Date of Patent: Sep. 23, 2003

(54) NETWORK COMPONENT FAILURE IDENTIFICATION WITH MINIMAL TESTING

(75) Inventors: Mark H. Johnson, Los Gatos, CA (US); Thomas G. Magorka, San Jose, CA (US)

(73) Assignee: Hewlett-Packard Development Co.LP, Houston, TX (US)

( * ) Notice: Subject to any disclaimer, the term of this patent is extended or adjusted under 35 U.S.C. 154(b) by 0 days.

(21) Appl. No.: 09/528,476

(22) Filed: Mar. 17, 2000

Related U.S. Application Data (60) Provisional application No. 60/124,794, filed on Mar. 17, 1999.

(51) Int. Cl.[7] ................................................. G06F 11/00
(52) U.S. Cl. ................................................. 714/4; 710/15
(58) Field of Search ........................... 714/4, 7, 3, 8, 714/25, 26, 27, 30, 32, 39, 42, 44, 56; 710/15, 18, 17, 65

(56) References Cited

U.S. PATENT DOCUMENTS

| | | | | |
|---|---|---|---|---|
| 4,703,483 A | * | 10/1987 | Enomoto et al. | 371/24 |
| 5,410,551 A | * | 4/1995 | Edwards et al. | 371/25.1 |
| 5,509,128 A | * | 4/1996 | Chan | 395/311 |
| 5,675,728 A | * | 10/1997 | Kunda et al. | 395/183.04 |
| 5,691,991 A | * | 11/1997 | Kessler et al. | 371/22.3 |
| 5,712,857 A | * | 1/1998 | Whitman et al. | 371/22.1 |

* cited by examiner

*Primary Examiner*—Nadeem Iqbal
(74) *Attorney, Agent, or Firm*—Oppenheimer Wolff & Donnelly LLP

(57) ABSTRACT

This invention discloses a highly accurate and efficient means to identify a failing component in a network with a minimum of testing. Developed to Support the Compaq Computer ServerNet® system area LAN technology, the methods and apparatus disclosed can be applied to any LAN based system with routing tables that are fixed and known for the duration of the testing. Disclosed new methods include a means to determine a minimal set of tests, a means to use global statistics to identify the most likely failing component, and a further means to refine the failing component list. This invention was reduced to practice.

7 Claims, 4 Drawing Sheets

FIGURE 1: MAX8, X FABRIC

FIGURE 2: MAX8, Y FABRIC

FIGURE 3: MAX16, X FABRIC

FIGURE 4: MAX16, Y FABRIC

NETWORK COMPONENT FAILURE IDENTIFICATION WITH MINIMAL TESTING

CROSS-REFERENCES TO RELATED APPLICATIONS

This application claims priority to co-pending U.S. Provisional Patent Application No. 60/124,794, filed Mar. 17, 1999, the disclosure of which is incorporated herein in its entirety for all purposes.

BACKGROUND OF THE INVENTION

1. Field Of The Invention

The present invention relates to a method and system for providing accurate conductivity and diagnostic information computer systems, and more particularly, to a system and method for identifying failing components along paths within a computer network by using a minimum amount of information and a simple analysis.

2. Description Of The Prior Art

There is a long commercial history of LAN (Local Area Network) and TCP/IP path verification using periodic path tests or on-demand path tests. The simplest of these two methods is known as a "ping". Ping refers to any of several low-network functions that return a testable result as a result of a request made to an end node (a component such as a processor or Ethernet board that has T NET address). Probe based testing is conceptually simple to do. More, importantly, a ping is using the network components in the same way they are normally used. If a ping is successful, there is considerable confidence that the path is working. Finally, because probe based testing is active, redundant paths that happen to be inactive are tested along with active paths, allowing latent faults to be detected soon after they fail rather than when the path is needed. This early detection allows early repair thereby significantly reducing the risk of a system failure.

One disadvantage of probe based testing is that the only way to detect errors is to generate probes and observe the results. The probe based testing must be run often enough to ensure that failures are identified quickly. Often, there are many events available to indicate a potential problem. These events plus a periodic event in a manual request start, all trigger the same set of test probes.

A second disadvantage of probe based testing is that complete coverage of a large network can logically require N*N tests, where N is the number of end nodes that need to be tested. Thus, N can be as large as 64. Without some form of path reduction, probe testing would require 64*64 or 4096 tests. The time to do this much testing is very large.

During these tests, identification of a fault is generally easy. A ping fails normally as a time out. However, a single path traverses many components, therefore a failing path is not diagnostic for any particular repair action.

If any one of the elements fails, many path tests will fail. The larger the system or network, the larger the number of tests that fail. Thus, the challenge is using the failing path information to identify the failing component. This is complicated by the need to identify multiple faults that occur at one time. Path analysis based on the assumption of a single failure is generally risky because there is often more than one fault within the system or network.

One technique for failure isolation is to run diagnostics on each component in each failing path to identify the failure. However, this technique may be very lengthy and complex.

Another technique for failure isolation is to implement a set of rules within an expert system. However, this is generally a significant development task and one that must be maintained frequently. Furthermore, many systems and networks have little or no verification coverage of components that often include significant network functionality. In some instances, fault coverage of components has included building error logic detection into each of the components and then generating an event for any errors detected. However, implementing such an approach would require generating new error information or reading internal status registers to determine if an error had occurred. While such an approach may be effective, it is very expensive in time and components and also is not helpful for monitoring unused redundant paths.

SUMMARY OF THE INVENTION

The present invention provides an efficient method and system for providing accurate connectivity and diagnostic information for network components.

In accordance with one aspect of the present invention, a method of identifying failing components within a computer system or network includes identifying signal paths of components within the system as a set of signal paths. The method further includes eliminating never used signal paths from the set and eliminating common sub paths from the set. The remaining sub paths are grouped into outbound paths and return paths and a test signal is sent over each outbound path and a corresponding return path.

Pass/fail information is expressed in terms of components that have been traversed by the test signals and likely failing components are identified in a priority order.

On accordance with another aspect of the present invention, the method orders the likely failing components by ordering a component table by the percentage of tests that failed. This provides for very effective failing component identification.

In accordance with a further aspect of the present invention, the method orders the likely failing components by sub-ordering the component table by the total number of tests.

In accordance with yet another aspect of the present invention, a further sub-ordering of the likely failing components uses component-specific knowledge to thereby produce effective fault isolation. In particular, cables within the system with less than 100% failure rates for all the tests are eliminated.

In accordance with a further aspect of the present invention, the method includes performing additional testing of the components that have been identified as having a high priority as a likely failing component.

In accordance with a further aspect of the present invention, diagnostics are performed on few parts that are further identified as likely failing components.

In accordance with another aspect of the present invention, additional test signals are sent over identified paths to resolve ambiguities with respect to components that are identified as likely failing components.

DESCRIPTION OF THE SPECIFIC EMBODIMENTS

Glossary

Certain terms and acronyms used in this document shall have the following meaning unless otherwise indicated.

| Term | Definition |
| --- | --- |
| component | As used herein, a component is a single field or customer replaceable unit in a system. |
| CRU | Customer Replaceable Unit. |
| daughter card | A small printed circuit (PC) board installed on the MSEB. Up to 6 of 3 types may be installed on the MSEB. Daughter cards are FRU's. |
| end node | A component such as a processor or Ethernet board that has a Tnet address. |
| fabric | As used here, a ServerNet LAN fully connecting all S-Series system components. The entirety of the ServerNet components that collectively comprise a ServerNet LAN (PMFs, IOMFs, SEBs, MSEBs and Cables). There are normally two logically identical fabrics in an S-Series system: X and Y. |
| FRU | Field Replacement Unit. |
| Group | A cabinet. |
| IOMF | I/O Multi-Function. A CRU containing a router, Ethernet, service processor, SCSI controllers, and many other functions. |
| Module | A component of a Group. (almost always set of 1) |
| Mrouter | Maintenance router ASIC that provides SMB and GPIO ports. |
| MSEB | Modular ServerNet Expander Board. |
| NSK | Non Stop Kernel--An operating system supporting NonStop Himalaya S-series. |
| node | node see end node. |
| path | A route through a ServerNet Fabric from one end node to another. |
| path Test | Testing a path using a ping function. |
| ping | Any of several low-level network functions that return a testable result as a result of a request made to an end node. |
| PMF | Processor Multi Function. A CRU containing the Non-Stop processor, memory, a router, Ethernet, service processor, SCSI controllers, and many other logical functions. |
| S-Series | Compaq NonStop computer systems featuring ServerNet interconnections and full hardware and software fault-tolerance. |
| SEB | ServerNet Expander Board. |
| ServerNet | A very high speed LAN interconnect using interconnected routers. The routing path is fixed and implemented in on-board routing tables. A connection from one leaf node to another will always follow the same path. |
| Slot | The most granular official part of Himalaya S-Series component naming. A cabinet has many slots. Some are used for disks, power supplies, and fans. Others (Slots 50 to 55) in each cabinet have one or two ServerNet connections built into the backplane. CRUs and FRUs are identified by the slots they fill. |
| SMB | Serial Maintenance Bus |
| Tnet | ServerNet (internal name). |
| X fabric | One of two redundant fabrics including PMFs and IOMFs in Slot 50, SEBs in Slots 51 and 53, and cables. |
| Y fabric | One of two redundant fabrics including PMFs and IOMFs in Slot 55; SEBs in Slots 52 and 54, and cables. |

The purpose of this invention is to provide accurate connectivity and diagnostic information for components of a multiple processor or multiprocessor system efficiently. Certain of such systems have no verification coverage of some the components of the system, and limited coverage of components that include significant system functionality. For a large multiprocessor system, there is no coverage of about many of the CRUs and FRUs of the system and limited coverage of an additional number of all CRUs and FRUs. The previous means of providing such systems fault coverage has been to build error logic detection into each of the components, then generate an event for any errors detected. Implementing this approach would require generating new error information, or reading internal status registers to determine if an error had occurred. While effective, this approach is very expensive in time and components, and is not helpful for monitoring unused redundant paths. A more efficient approach was needed.

Probe Based Testing

There is a long commercial history of LAN and TCP/IP path verification using periodic path tests or on-demand path tests. The simplest of these path tests is known as a "ping". Probe based testing is conceptually simple to do. More importantly, a ping is using the network components in the same way they are normally used, so if a ping is successful, there is considerable confidence that the path is working. Finally, because probe based testing is active, redundant paths that happen to be inactive are tested along with active paths, allowing latent faults to be detected soon after they fail, rather than when the path is (urgently) needed. This early detection allows early repair significantly reducing the risk of a system failure.

One disadvantage of probe based testing is that the only way to detect errors is to generate probes and observe the results. The probe based testing must be run often enough to ensure that failures are identified quickly. In our case, there are many events available to indicate a potential problem. These events, plus a periodic event and a manual test start all trigger the same set of test probes.

A second disadvantages of probe based testing are that complete coverage of a large network can logically require N*N tests, where N is the number of end nodes to test. In this case, N can be as large as 64. Without some form of path reduction, we would need 64*64 or 4096 tests. The time to do this much testing would be very large.

Fault Identification

Identification of a fault is easy. A ping fails—normally as a timeout. However, a single path traverses many components, so a failing path is not diagnostic for any particular repair action.

If any one of these elements fails, many path tests will fail. The larger the system, the larger the number of tests that fail. The challenge is using the failing path information to identify the failing component. This is complicated by the need to identify multiple faults at once. Path analysis based on the assumption of a single failure is risky because there is often more than one fault in the network. One technique for failure isolation is to run diagnostics on each component in each failing path to identify the failure. This technique can be very lengthy and complex. Another technique for failure isolation is to implement a set of rules within an expert system—a significant development task, and one that must be maintained frequently.

What Is Considered New

The idea of using path testing as a complete or partial means to verify component connectivity is not new. Neither is the idea that failing path information can be used to help identify failing components. What is new is the development of a process that can use a minimum of information and a simple analysis technique to identify failing components. The process has the unusual property of performing with increasing effectiveness as the size of the system grows.

Minimizing the Number of Path Tests

Complete coverage of a large network can logically require N*N tests, where N is the number of end nodes to test. In this case, N can be as large as 64. Without some form of path reduction, we would need 64*64 or 4096 tests. In the disclosed reduction to practice, this total was reduced to 140 tests. The number of path tests can be reduced based on the following observations:

A ping verifies both the outbound and return paths through a fabric. As a result, only one half of all possible paths need be tested. One way to do this is to only test from a lower valued group to a higher valued group.

Eliminate never used paths. Some paths are never used by design. (In this reduction to practice, IOMPs never connect to each other.)

Eliminate common sub paths. Many end node to end node tests share common sub-paths. Use knowledge about the configuration to test only enough paths to ensure that each sub-path is tested once. The means to identify common sub-paths will be network technology specific. In the described reduction to practice, the limited number of supported configurations encouraged a static algorithm.

Mapping Path Test Results to Components

Once path tests are complete, the pass/fail information can be expressed in terms of what components have been traversed. Translating the results from paths to components very significantly reduces the complexity of the failure identification analysis. The most logical way to do this is to store the path test name and results for every element and then perform path by path analysis on each failing path. We have determined that this is unnecessary to obtain high quality results. All that is necessary is to collect counts of the number of path tests that used each component and the number of these tests that failed (or passed).

Fault Identification Using Statistics

Once the results of the path tests are mapped to the components they use, simple statistical means can be used to efficiently identify the likely failing components in priority order.

Ordering a component table by the percentage of tests that failed (or passed) provides very effective failing component identification.

A sub-ordering of the component table by total number of tests improves this identification.

A further sub-ordering using component-specific knowledge produces effective fault isolation. In particular, eliminate any cables with less than 100% failure rates for all tests that use that cable. Additional tiebreak ordering is described in the reduction to practice below.

Extensions and Enhancements

Effectiveness with a Sub-optimal Set of Path Tests

This technique will also work using sub-optimal path testing, including path testing that is determined dynamically. The ideas described in 2.2 and 2.3 above work if extra tests are performed. Even if too few tests are done, the resulting failure identification is far more effective than chance.

Used in combination with other fault isolation techniques

This technique is also very effective when used in combination with other fault isolation techniques:

Component Testing

Additional testing of the components at the top of the failure list can refine the recommended repair action or further isolate the failure. Once the ordered list of possible failures is generated as described above the amount of additional testing needed is minimized.

Other Testing

Diagnostics or additional path tests can be focused very narrowly on a few parts to resolve any remaining ambiguities.

Invention Description: Effective Network Component Failure Identification With Minimal Testing There is no remote diagnostic coverage of the SEB or cables on S-Series systems. Providing some means to produce a go-no-go result with accurate repair analysis is a very high priority field requirement. Tools needed to discover and diagnose ServerNet problems in the field are not available. This existing deficiency is a key contributor to the S-Series serviceability problems in the field. ServerNet serviceability will rely on external tools and higher level software to alert TSM ServerNet IA to potential problems. These alerts (mostly EMS events) kick off some analysis to determine if there is a failure, and if a failure is detected, isolate the problem to suggest an appropriate repair action. This document identifies a means to provide inter-cabinet "stuck-at" fault identification and repair analysis based on careful use of SP to SP path verification testing (such as that used by SPTOOL path-test command).

Concept

The SPTOOL path-test today runs a connectivity check from group (cabinet) one to every other group (cabinet) in the system. Two tests are run—one for the X fabric and the other for the Y fabric. It is possible to request this same testing from each of the cabinets in the entire system. If every test runs correctly, then the inter-cabinet components of ServerNet are shown to be working well, because many packets will be routed across all extra-cabinet ServerNet paths. (There are more ServerNet paths, but this testing does not cover them.)

Figure 1:
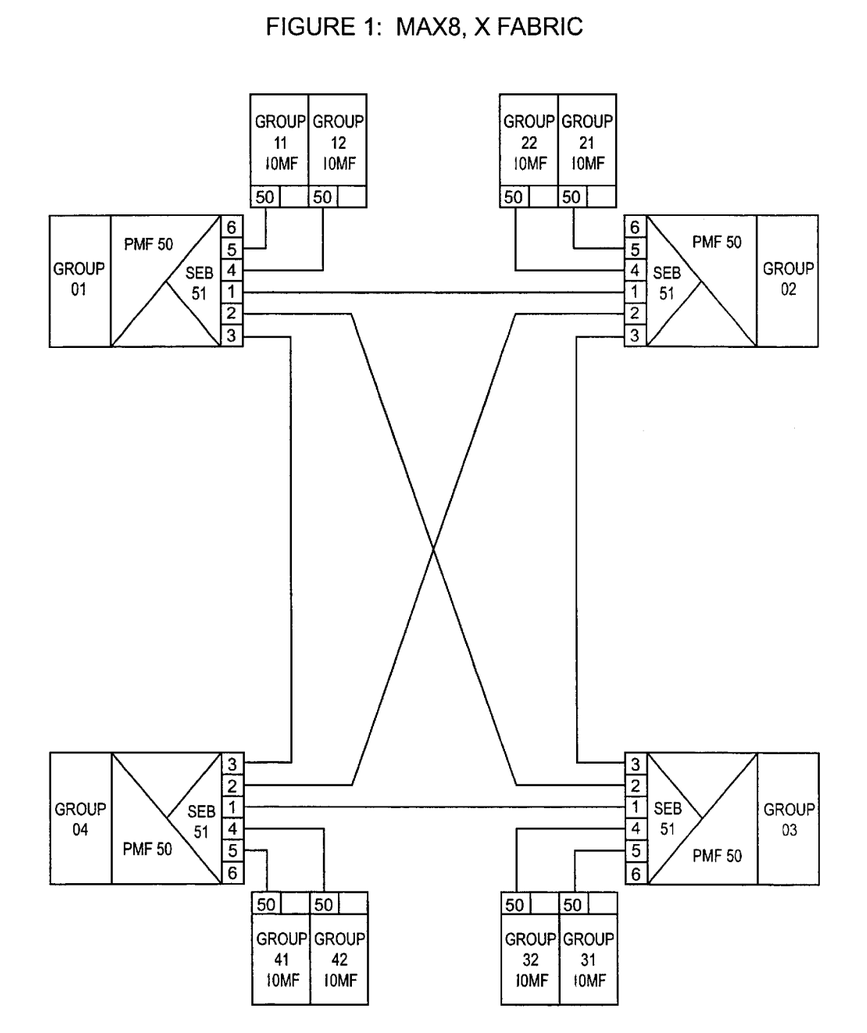
FIGS. 1 and 2 illustrate a system of CPUs and interconnecting devices communicatively coupled to one another by a first (X) and a second (Y) system area networks (fabrics), respectively, for employing the present invention.
Figure 2:
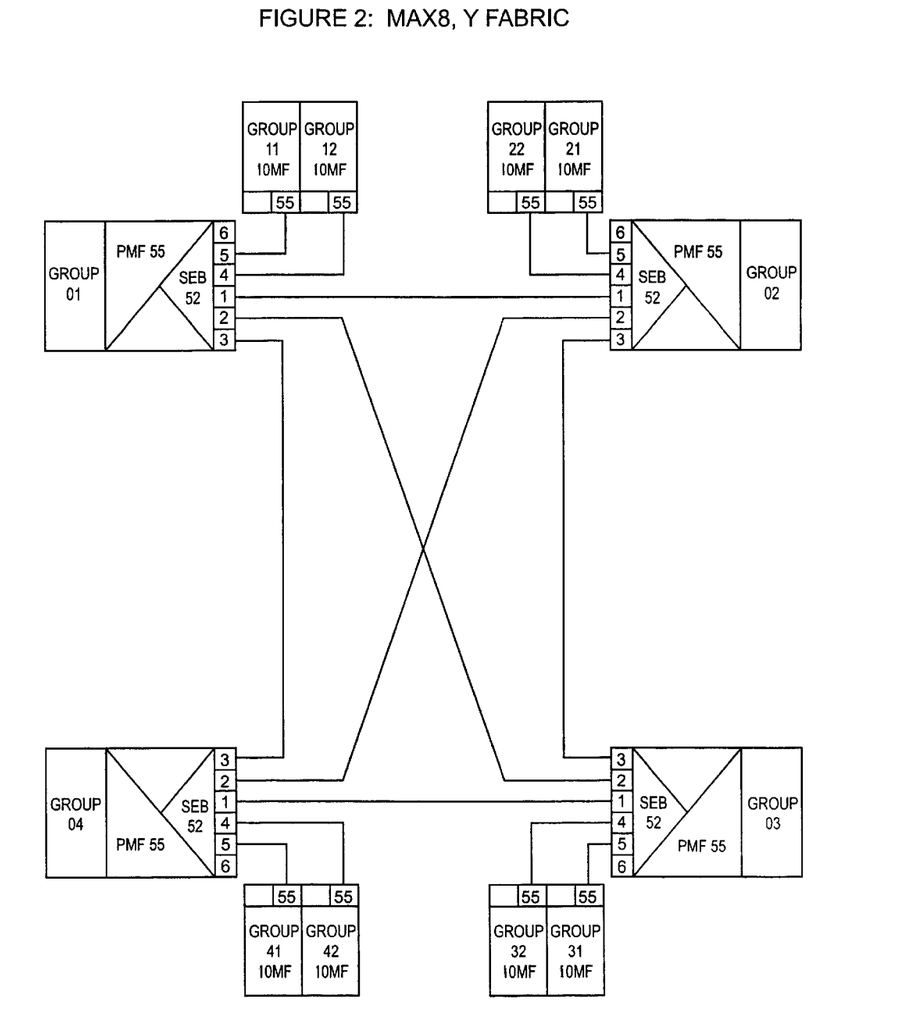
Figure 3:
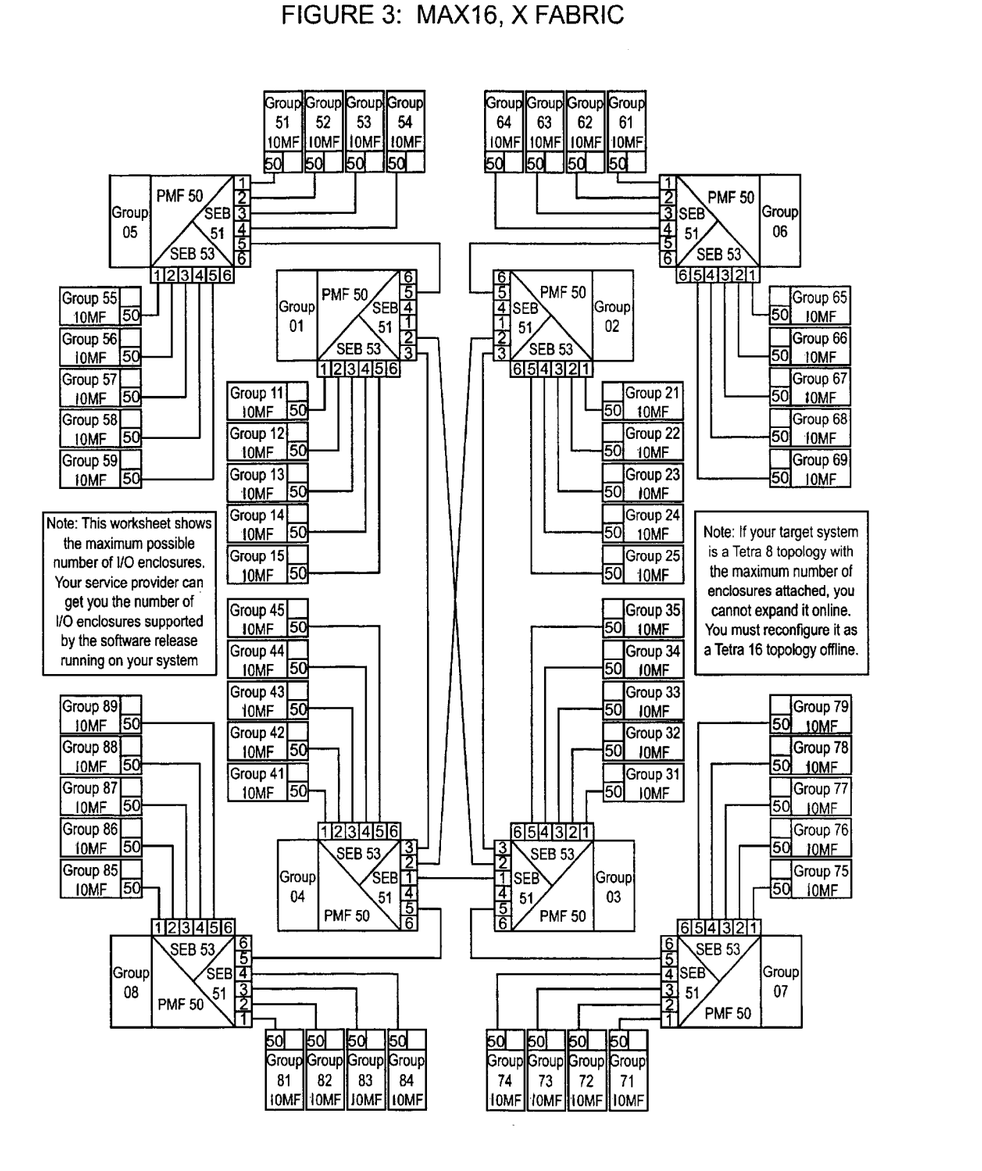
FIGS. 3 and 4 respectively illustrate a second system of CPUs and interconnecting devices communicatively coupled together by X and Y fabrics.
Figure 4:
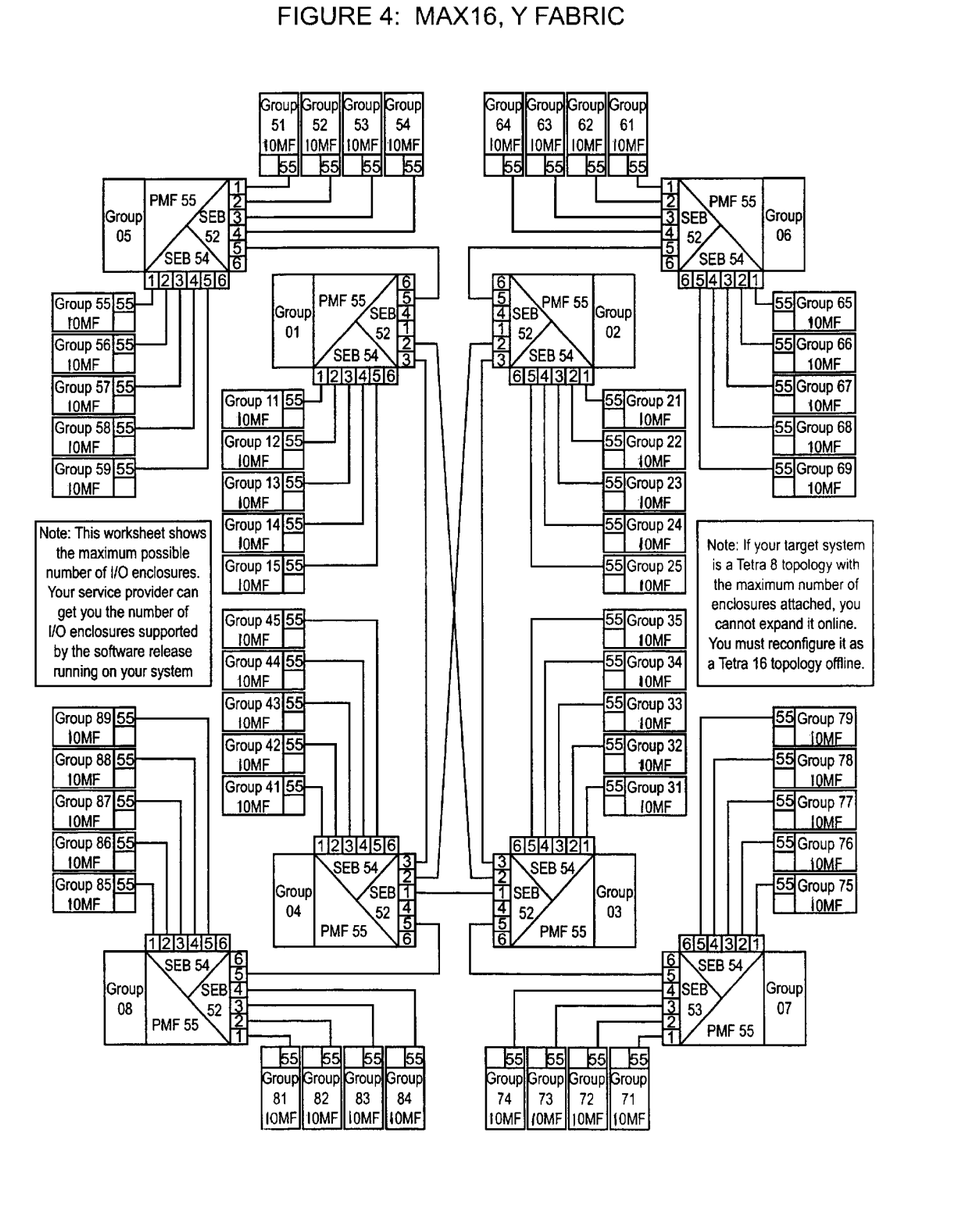

Because S-Series uses exactly 2 fixed ServerNet configurations and fabrics, knowledge of the configuration and fabric fully determines the components traversed for each cabinet to cabinet path. The two configurations are named MAX8 and MAX16. Each configuration determines where cabinets of each type may be included in a system. (The configurations show where groups can go; not all groups are present in most implementations.) In order to assure fault-tolerance, ServerNet connectivity is fully duplicated between all cabinets. Conventionally, we consider the duplicated ServerNet components to be members of two fabrics, X and Y. FIGS. 1, 2, 3, and 4 show each of these four configurations.

Table 1 shows some examples of components traversed by representative path tests.

TABLE 1

| Test | Configuration | Fabric | From Cab | To Cab | Components Traversed (Name-group-slot) |
|---|---|---|---|---|---|
| 1. | MAX8 | X | 1 | 2 | PMF-1-50, SEB-1-51, CBLX.1-2, SEB-2.51, PMP-2-50 |
| 2. | MAX8 | Y | 1 | 2 | PMF-1-55, SEB-1-52, CBLY-1-2, SEB-2-52, PMF-2-55 |
| 3. | MAX8 | X | 1 | 11 | PMF-1-50, SEB-1-51, CBLX-1-11, IOMF-11-50 |

TABLE 1-continued

| Test | Configuration | Fabric | From Cab | To Cab | Components Traversed (Name-group-slot) |
|---|---|---|---|---|---|
| 4. | MAX16 | X | 1 | 11 | PMF-1-50, SEB-1-53, CBLX-1-11, 11,IOMF 11-50 |
| 5. | MAX16 | X | 3 | 81 | PMF-3-50, SEB-3-51, CBLX-3-4, SEB-4-51, CBLX-4-8, SE8-8-51, CBLX-8-81, IOMF-81-50 |
| 6. | MAX16 | X | 3 | 85 | PMF-3-50, SEB-3-51, CBLX-3-4, SEB-4-51, CBLX-4-8, SEB-8-51, PMF-6-50, SEB-8-53, CBLX-8-85, IOMF-85-50. |

If we assume that a failing component (or connection) causes any failing path test, each test can be viewed as a probe that either indites or exonerates the components it traverses. Multiple test results can be combined to offer an opinion about what parts are working or failing. Common components shared between passed and failed tests are said to be working and the non-shared components are likely causes of failure. Looking at Table 1, if test 1 passes and test 3 fails, the "good" components are PMF-1-50, SEB-1-51, CBLX-1-2, SEB-2-51, and PMF-2-50. The likely failed components exercised in test 3 are those unshared with test 1: CBLX-1-11, IOMF-11-50. If we adopt a rule of thumb that says, "if every test that uses a particular cable fails, call out the cable first." then CBLX-1-11 should be the first part changed out. Once an ordered list of potentially failing parts is determined, an ordered set of repair actions can be generated and formatted as an alarm or other notification.

The challenge in inter-cabinet ServerNet IA is to convert the concept described here into a concise algorithm.

Algorithm

The list below itemizes the issues that must be addressed by a successful algorithm that implements the path-test based ServerNet IA based checking:

Paths to test: A full path test is not desirable because of the 4096 paths that must be tested to completely cover the 64 by 64 matrix. Multiple tests with at least some paths common and others separate allow optimal isolation.

Data collection: The path test itself must be quick and non-destructive. Path test information must be recorded in some way to capture the results. Results could be recorded either per path tested or on a per-component tested basis. A good choice of data recording will perform some of the failure analysis required. The total resource needed to store the results of all testing should scale linearly with the number of components, rather than as the number of possible connections. Finally, trace information must be recorded efficiently.

First Pass Analysis: Good data collection should produce an ordered list of the most probably failing components. The amount of data reduction needed to produce an ordered list of potentially failing FRU's or CRU's should be minimal.

Tie Breakers: In many situations, components will be seen to be equally likely to be faulty. The algorithm must provide a way to break these ties to identify the most likely failed component. Tie breaking can be driven by heuristics about the cost or time to repair or probability of failure.

Reporting mechanism: Status and repair information must be reported appropriately along with enough additional information to allow error analysis if necessary.

Paths to Test

Assumptions:

The time to test an unimplemented path is very long, so it should be avoided if possible.

Tests of a defective path will fail via timeout.

The X and Y fabrics are topologically identical. As a result, the same path tests are run on both fabrics.

Cabinet 1 exists in all systems.

Only hard failures must be detected. A failing component will be assumed to be consistently failing (stuck-at fault). This fault need not cause every path or use of the component to fail, but does imply that a given connection test will return the same result each time it is exercised.

Because path tests include both a request and a reply, and we are looking for hard failures, bidirectional testing is part of every path test. As a result, if the path between group 1 and group 2 passes, the path test from group 2 to group 1 need not be tested.

All paths into or out of a component must be tested at least once; however, all combinations of paths through a component need not be tested.

The total number of paths tested should be minimized subject to the assumption above.

Results from the analysis algorithms are insensitive to redundant testing, so the test algorithm need not be minimal except to reduce test time.

The list of groups to test will be generated from the list of cabinets discovered. TSM has a table of known CRU's. This table will be used as the source for the list of known cabinets. The basic algorithm is to test the group to group path from each group to all of the groups with a higher cabinet ID. Further reductions in the number of paths tested can be achieved as follows:

MAX8 Paths to Test

For MAX8, the base algorithm of testing from each PMF group to all groups with a higher group number is minimal.

Max total paths to test for each fabric is: 11+10+9+8=38

MAX16 Paths to Test

The MAX16 case can use the algorithm defined in detail below. The intent of this algorithm is to test each inner PMF group to all other PMF groups with a higher number, and test each I/O enclosure from its associated PMF Group and from one remote PMF group. This covers every component to component path and route in the maximum configuration used during normal operations.

/* Per Group Testing */

Path test group 1 to PMF groups in the range of 2 to 8. (to PMF, 7 tests)

Path test group 1 to all I/O groups in the range of 11 to 45. (to all inner I/O groups, 20 tests)

Path test group 1 to all I/O groups in the range of 51 to 59. (to outer corner I/O groups, 9 tests)

Path test group 2 to PMF groups in the range of 3 to 8. (to PMF, 6 tests)

Path test group 2 to I/O groups in the range of 21 to 25. (to local I/O groups, 5 tests)

Path test group 2 to all I/O groups in the range of 61 to 69. (to outer corner I/O groups, 9 tests)

Path test group 2 to I/O groups in the range of 11 to 15. (to group 1 local I/O groups, 5 tests)

Path test group 3 to PMF groups in the range of 4 to 8. (to PMF, 5 tests)

Path test group 3 to I/O groups in the range of 31 to 35. (to local I/O groups, 5 tests)

Path test group 3 to all I/O groups in the range of 71 to 79. (to outer corner I/O groups, 9 tests)

If group 2 does not exist, Path test groups 3 to I/O groups in the range of 11 to 15.

Path test group 4 to PMF groups in the range of 5 to 8. (to PMF, 4 tests)

Path test group 4 to I/O groups in the range of 41 to 45. (to local I/O groups, 5 tests)

Path test group 4 to all I/O groups in the range of 81 to 89. (to outer corner I/O groups, 9 tests)

If groups 2 and 3 do not exist. Path test group 4 to I/O groups in the range of 11 to 15.

Path test group 5 to PMF groups in the range of 6 to 8. (to PMF, 3 tests)

Path test group 5 to I/O groups in the range of 51 to 59. (to local I/O groups, 9 tests)

If groups 2, 3, and 4 do not exist, Path test group 5 to I/O groups in the range of 11 to 15.

Path test group 6 to PMF groups in the range of 7 to 8. (to PMF, 2 tests)

Path test group 6 to I/O groups in the range of 61 to 69. (to local I/O groups, 9 tests)

Path test group 7 to PMF group 8. (to PMF, 1 test)

Path test group 7 to I/O groups in the range of 71 to 79. (to local I/O groups, 9 tests)

Path test group 8 to I/O groups in the range of 81 to 89. (to local I/O groups, 9 tests)

Max tests for a 64 cabinet system for each fabric is: 7+20+9+6+5+9+5+5+5+9+4+5+9+3+2+1+4*(9)=140

Data Collection

For each fabric, the data should be collected as a set of paths tested, named by the starting and ending Group, along with the results of the path test: either a Pass or Fail. This information must be saved for later reporting (see below) and also used to populate the ServerNet Component table pass/fail information as described below.

First Pass Analysis

Assumptions:

Each group includes between 1 and 3 components for each fabric. (See FIGS. 1→4 to determine the possible components.) ServerNet components include PMFs, IOMFs, and SEBS.

Cables are between two groups. Each is named for the two groups it connects.

Once the groups are known, a table can be built that allows a count of times tested and times failed to be kept for each ServerNet component.

An additional table can be constructed that identifies all of the components tested for each path. (This table can be part of the program.)

After each test is run (or after all tests are run), the ServerNet component table is updated to contain the number of times each component was tested and the number of times the test failed (or passed).

If there are no failing tests associated with any component, a "no problems found" report can be generated for the tested fabric. If there are failing tests, the components can be examined to determine the percentage of the tests given to each component that failed.

Failing Component Determination

Using the following algorithm, determine the order of most likely failed part.

1. Cables with less than 100% failure rates are assumed to be working.
2. If there are no ties, the component with the highest percentage of failed tests is the most likely to have failed, the second highest the second most likely, and so forth.
3. If there are multiple components with the same percentage of failures, the component with the most tests is the most likely to have failed, the second highest the second most likely, and so forth.
4. If there are components with the same percentage and number of failures, the ranking sequence is SEB most likely, followed Cables, IOMFs and PMFs in that order.

Repair Actions

Up to 5 possibly failing components are reported in the repair actions in the priority order determined by the algorithm above. The recommended use of this report is to perform the first repair action, then re-run ServerNet Group Connectivity testing. If the same repair actions are still there, then the second recommended repair action should be performed. The process continues until the symptoms change or the problem is fixed.

Because it is impossible to determine which side of a connector a failure is on, all cable failures will generate a repair action recommending that the cable be reseated, then replaced. The repair action will also list replacing the SEB on each end (one at a time) if the first two remedies fail to change the symptoms.

Because cable failures always generate a repair action that includes the attached SEBs as possibilities, sometimes the same SEB will be called out in more than one action. Hopefully, users will realize that they only need to change a SEB once before moving to the next suggested action.

Reporting

A single alarm is generated with up to 5 repair actions included as described above. This alarm is updated every time the ServerNet Group Connectivity test is run. It is expected that after most repair actions, the symptoms will change promoting a new suggested fix to the top priority.

In addition to the repair action, the alarm detail will include information allowing the exact results of the path tests to be analyzed in case an incorrect diagnosis is made. The diagnostic information will encode the path test information in 9 64 bit words.

0:<encode groups>Bit 0 is Group 1, Bit 63 is Group 89, and the others are mapped in TBS fashion.

→8:<encode failures for tests from Group 1→8, respectively>0=no test or success, 1=failed test This encoding combined with the known algorithm (described above) for testing provides enough information to determine test results in a minimum of space.

Results and Analysis

An example of the paths tested, component table and failure identification (from an early form of the invention) for a "real" failing system is shown in Appendix A hereto. At the bottom of the Appendix A, the first recommended repair action is to replace the PMF CRU in Group 4, Module 1, Slot 55. The other suggested repair actions are to be attempted only if performing the first action does not change the symptoms. After the PMF was changed, the problem was corrected.

The 127 tests on the Y fabric included 27 failing tests. As shown in the component table included in Appendix A, 67 components were used in at least one test that failed. In this case, the component with the highest percentage of failing tests was listed as the first choice.

Other testing and extensive fault injection testing has produced results showing similar precision.

What is claimed is:

1. A method of identifying failing components within a computer system or network, comprising:

identifying signal paths of components within the system as a set of signal paths;

eliminating non-used signal paths and common sub-paths from the set of signal paths;

grouping remaining sub-paths as outbound paths and return paths;

sending a test signal over each outbound path and a corresponding return path;

expressing pass/fail information in terms of components that have been traversed by the test signal; and identifying likely failing components in a priority order.

2. The method of claim 1, further comprising:

ordering the likely failing components by the percentage of tests failed; and forming a component table identifying the ordered likely failing components.

3. The method of claim 2, wherein the ordering step includes:

identifying the likely failing components by sub-ordering the component table by the total number of tests.

4. The method of claim 3, further comprising:

sub-ordering of the likely failing components with component-specific knowledge to produce effective fault isolation.

5. The method of claim 1, further comprising:

identifying components having a high priority as likely failing components; and performing additional testing of the components that have been identified as having a high priority as a likely failing component.

6. The method of claim 1, further comprising:

performing a diagnostic on a selected ones of the components identified as likely failing components.

7. The method of claim 1, further comprising:

sending additional test signals over identified ones of the outbound and corresponding return paths to resolve ambiguities with respect to components that are identified as likely failing components.

* * * * *